United States Patent [19]
Bello et al.

[11] Patent Number: 6,024,408
[45] Date of Patent: Feb. 15, 2000

[54] APPARATUS AND METHOD FOR INSTALLATION OF A CHILD CAR SEAT IN AN AUTOMOBILE

[75] Inventors: Raymond Bello, Yonkers; Susan N. Greenberg, White Plains; Thomas Carroll, Oceanside, all of N.Y.; Andy Bohan, Mahwah, N.J.

[73] Assignee: Best Associates, Pelham, N.Y.

[21] Appl. No.: 09/173,768

[22] Filed: Oct. 16, 1998

Related U.S. Application Data

[60] Provisional application No. 60/081,786, Apr. 14, 1998.

[51] Int. Cl.[7] .............................. A47B 97/00; A47C 31/00
[52] U.S. Cl. .................................... 297/250.1; 297/463.1; 297/463.2; 24/68 CD; 24/909
[58] Field of Search ................................ 24/68 CD, 909; 297/250.1, 463.1, 463.2

[56] References Cited

U.S. PATENT DOCUMENTS

| 4,604,773 | 8/1986 | Weber et al. .......................... 24/909 X |
| 4,822,104 | 4/1989 | Plesniarski ............................ 297/250.1 |
| 4,823,443 | 4/1989 | Waters .................................. 24/909 X |
| 5,611,597 | 3/1997 | Lanz ..................................... 297/250.1 |

*Primary Examiner*—Anthony D. Barfield
*Attorney, Agent, or Firm*—Levine & Mandelbaum

[57] ABSTRACT

A is wound around a drum of a winch mounted on a pressure bar which is placed on a child car seat after it is positioned where it is to be installed, usually on the rear passenger seat of an automobile. Fasteners at the ends of the belts are attached to a respective seat belt on each side of the child car seat, or to an anchoring rod extending from underneath the automobile. As the winch is actuated to tighten the belt the child car seat is pressed into the passenger seat where it can be firmly held in place while an installer tightens a pair of passenger seat belts passed through the child car seat to hold it securely in place.

7 Claims, 5 Drawing Sheets

APPARATUS AND METHOD FOR INSTALLATION OF A CHILD CAR SEAT IN AN AUTOMOBILE

This application claims benefit of provisional application Ser. No. 60/081,786 filed Apr. 14, 1998.

BACKGROUND OF THE INVENTION

This invention relates to a device for installing a child car seat in an automobile. More specifically, the invention is directed to a method of, and the construction of apparatus for, enabling a child seat to be strongly urged into the seat of an automobile while an automobile passenger seatbelt used to secure the car seat is fastened and tightened.

Car rental companies are required to temporarily secure a child seat in a rented car when the renter has a young child. The seat must be belted down so as to prevent any movement of the child seat relative to the automobile seat on which it is mounted. This requires that the installer exert a high degree of force on the child seat as it is being strapped in. Because of the cramped quarters in the rear seat compartment of an automobile which make it necessary for the installer to bend over the seat while applying pressure, there is a danger of serious back or other injury during the installation.

SUMMARY OF THE INVENTION

The aforementioned problems of the prior art are overcome by the instant invention which provides for a winch and belt to exert the necessary force while the seat is strapped in. A pressure member in the form of a rectangular U-shaped cross section has a winch, with a drum around which there is wound a tensioning belt, mounted on the flat surface of the pressure member. The tensioning belt is passed through guide rings at either end of the pressure member. The ends of the belt are then secured to passenger seatbelt buckles which are not being used to secure the child seat. Where a free passenger seatbelt buckle is not available, an auxiliary anchoring lever in the form of a rod may be placed on the ground under the automobile for receiving one end of the tensioning belt. The installer may then tighten the tensioning belt by actuating the winch after which he or she may secure the car's seatbelt through the child seat while the tensioning belt holds it in place. Thereafter, the winch can be released and the tensioning belt disconnected from the passenger seatbelts and/or optional anchoring rod leaving the child seat immovably secured. The web can be retracted onto the winch for later use.

DESCRIPTION OF THE PREFERRED EMBODIMENT

Figure 1:
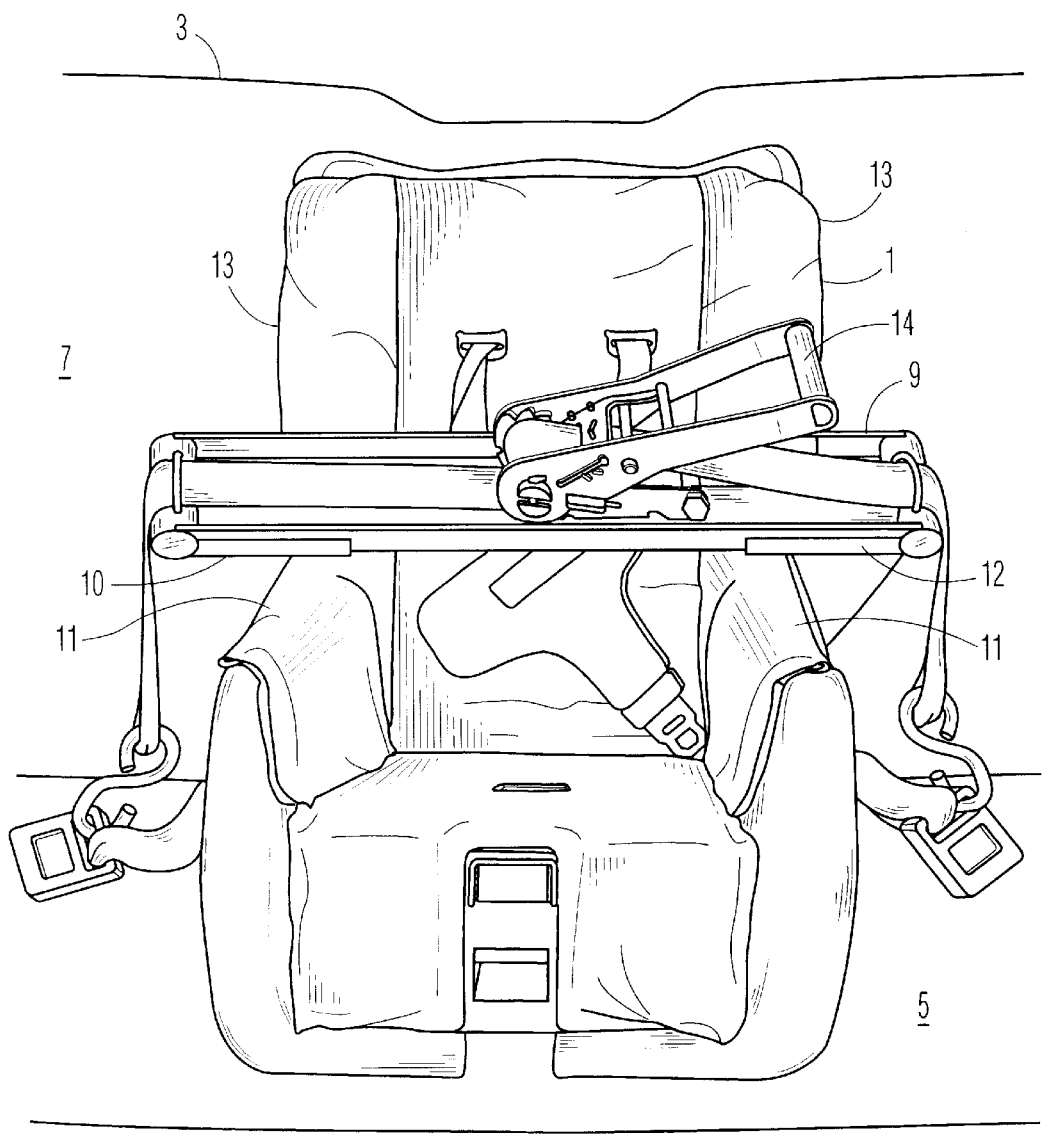
FIG. 1 is a front perspective view of the apparatus of the preferred embodiment of the invention in its intended environment.
Figure 2:
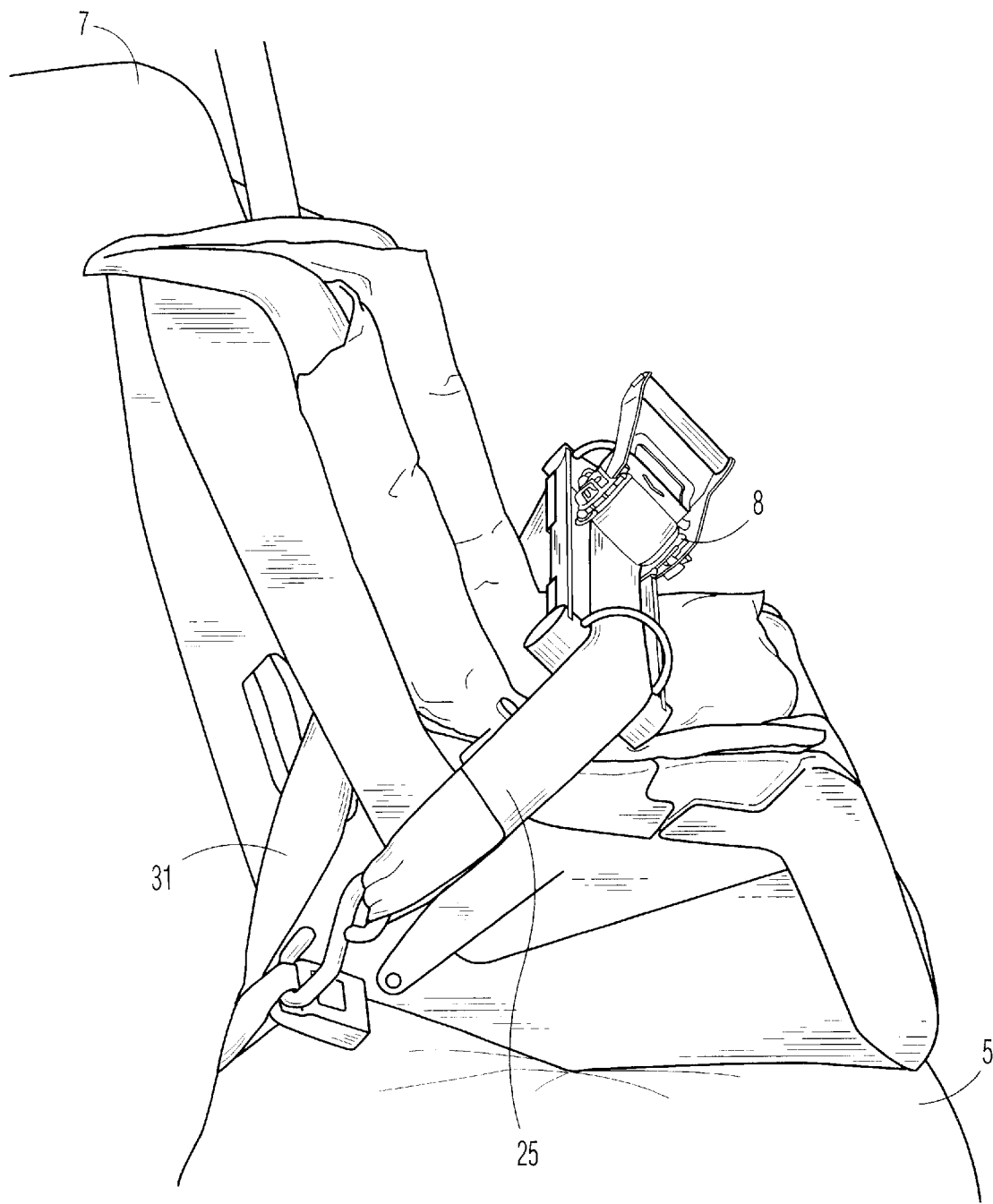
FIG. 2 is an end perspective view of the apparatus of the preferred embodiment of the invention in its intended environment.

Referring to FIGS. 1 and 2 of the drawings, a child car seat 1 is supported on a conventional rear passenger seat 3 of an automobile in a position normally intended for an adult passenger, i.e., having a conventional seat belt pair 31 including a belt segment with a male buckle and another belt segment with a female buckle that has an opening for receiving the male buckle and locking it in place. The bottom of the child car seat is on the surface of a cushioned bench portion 5 of the passenger seat 3 and the back of the car seat is against the cushioned backrest 7 of the passenger seat 3.

A pressure member 9 for urging the child car seat 1 into the cushioned passenger seat 3 against the resilient forces of the cushioned bench 5 and back 7 is formed from a rigid beam. The pressure member 9 is preferably hollowed out for lightness in weight, and, in the preferred embodiment of the invention, has a U-shaped cross-section. The pressure member 9 is rigid and can be formed from any material having sufficient strength to withstand the pressures to be applied in securing a child seat into the rear passenger seat of an automobile before the automobile seatbelt which secures the child seat is fastened and tightened. The beam 9 may be made of steel, aluminum, or another strong metal, or alternatively from a plastic or any of numerous other materials having sufficient similar properties of strength and rigidity sufficient to withstand the forces necessary to firmly press the child seat 1 into the passenger seat 3 so as to prevent relative movement therebetween while a passenger automobile seat belt is used to secure the child seat in place.

Mounted on the underside of the pressure member 9 are two friction pads 10, 12 spaced apart by a distance substantially equal to the width a the armrests 11 on a conventional child seat. As can best be seen in FIG. 1 the friction pads engage the armrests 11 and/or edges of the head protector side walls 13 of the child seat during installation thereby cushioning the force applied to the armrests 11 and side walls 13 of the child car seat 1 for avoiding damage to them when force is applied to the child car seat 1 to hold it in place.

In the preferred embodiment of the invention, the beam 9 is slightly longer than the width of the child car seat 1 so that it can lay across the armrests 11 of the child car seat 1 with each end of the beam 9 extending slightly beyond side walls 13 of the child car seat 1.

Upstanding side walls 17 running along each side of the beam 9 have C-shaped cut-outs 19 at their respective ends for receiving cylindrical handles 21, each of which has projecting from an upper portion of its circumference, a ring 23 for guiding a tensioning belt 25. The tensioning belt 25 may be made of woven nylon or similar materials and is preferably of the same material as is widely used for seatbelts in automobiles and airplanes. Affixed to each end of the tensioning belt 25 is a closed S-hook 29 having one segment passed through a loop in the tensioning belt. The opposite segment of the S-hook 29 is open so that it may be passed through an opening in a male buckle of a seat belt pair for a passenger position adjacent the one occupied by the child car seat 1 as best seen in FIG. 1, or through a loop in the seat belt as shown in FIG. 2.

Figure 3A:
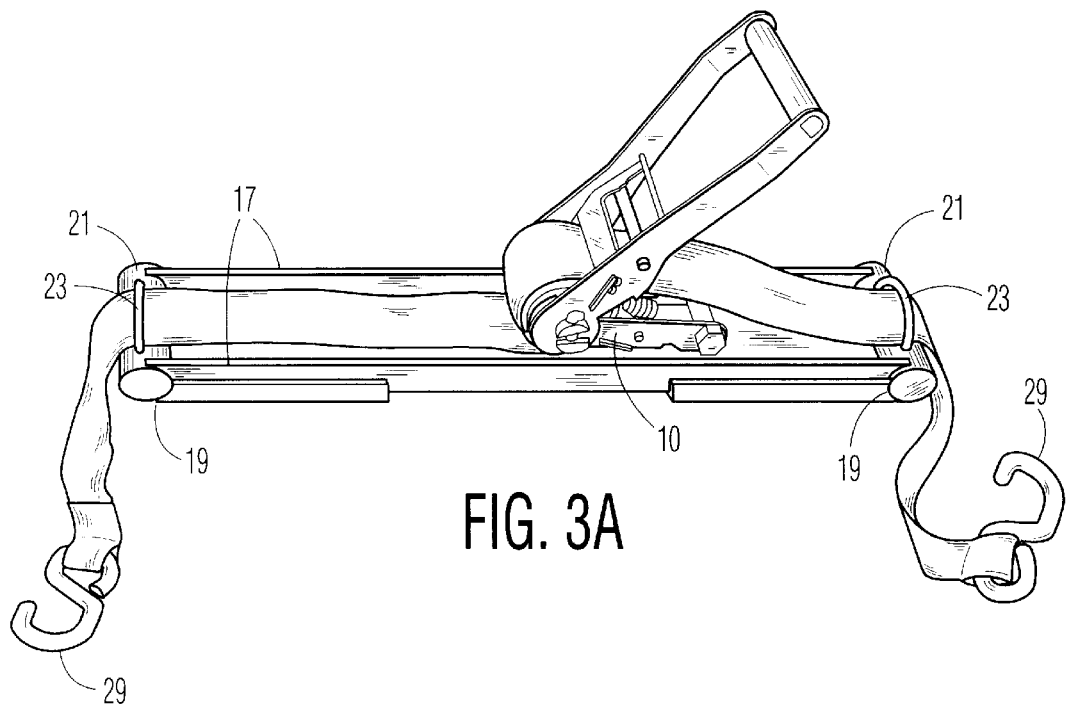
FIG. 3A is a perspective side and top view of the apparatus of the preferred embodiment of the invention.
Figure 3B:
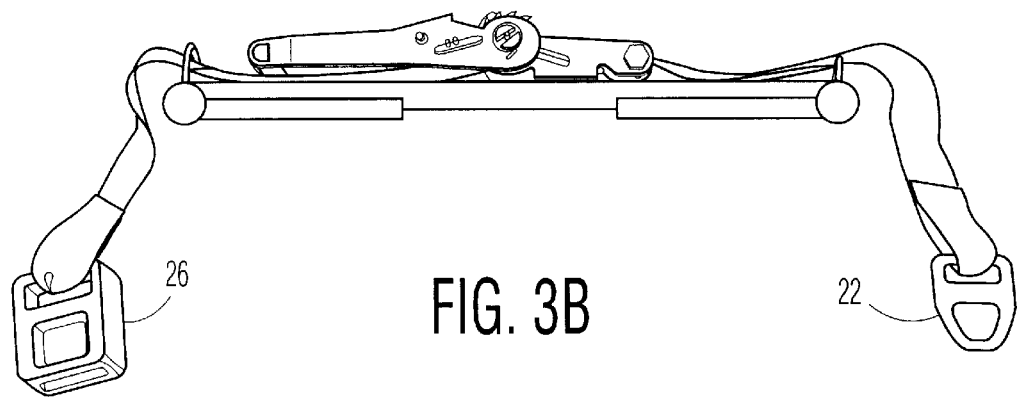
FIG. 3B is a side elevation view showing a modification of the apparatus of the preferred embodiment of the invention shown in FIG. 3A with substituted parts.

Referring additionally to FIG. 3A, mounted within the U-shaped channel of the pressure beam 9, approximately midway between the cylinders 21 at the respective ends of the beam 9, is a winch 10 having a drum or reel 8 about which the belt 25 is wound. The drum 8 is rotatably connected to the beam 9 through a ratchet mechanism, e.g., gear teeth on the circumference of an end of the drum 8 and a spring-loaded pawl mounted on an actuator arm 24 and having a cam surface engaging the gear teeth for permitting unidirectional rotation of the drum 8 as the actuator is swung in a back and forth motion. The ratchet mechanism of the winch 10 is conventional an will be known to those skilled in the art. As the actuator arm 24 is moved back and forth, the reciprocating swinging motion causes the drum 8 to rotate counterclockwise in the views of FIGS. 1 and 3 thereby shortening the portions of the tensioning belt 25 extending beyond ends of the beam 9.

To install a child seat in the center rear passenger seat of an automobile having 3 sets of passenger seatbelts, with the child seat empty and placed in the center of the rear passenger seat of an automobile, the installation apparatus of the invention is placed upon the child seat with the friction pads 10 and 12 at the intersection of the armrests 1 of the child seat with the integral upright walls 13 that protect the head of the child. In the latter position, the winch and web face upward and forward as can best be seen in FIGS. 1 and 2.

The belt 25 is extended from the winch 10, and passed through the guide rings 23. The ends of the tensioning belt 25 can be connected to respective passenger seat belt buckles on either side of the child car seat 1 with an S-hook attached to a tensioning belt passed through an opening in a corresponding male buckle on the passenger seat belt. Alternatively, a male buckle 22 at each end of the tensioning belt 25 (see FIG. 3B) can be inserted into the female buckle members of the automobile seatbelt at either side of the rear passenger seat or a female buckle 26 at either end of the tensioning belt 25 can receive the male buckle member of a corresponding automobile seatbelt.

With the beam 9 so mounted, the winch 10 is actuated by swinging the actuator arm back and forth until all of the slack in the tensioning belt 25 is taken up and the beam 9 is pressed against the car seat forcing it into the passenger seat 3. After the winch 10 has been actuated sufficiently to cause the beam 9 to exert pressure against the child car seat 1 sufficient to keep the child car seat 1 from being moved relative to the automobile passenger seat 3, the operator may let go of the actuator handle. With the child seat held in place by the pressure of the beam 9 transmitted from the tightened tensioning belt 25, the car seat belt is passed through the child car seat 1, buckled, and then tightened by taking up the slack in the passenger seat belt. Thereafter, a release lever 14 on the winch 10 is actuated to displace the pawl from between the ratchet teeth on the drum 8 to relieve the tension on the tensioning belt 25. The buckles, (or buckles and hooks) on the ends of the belt 25, are then unfastened from the seatbelt buckles for the side passenger seats of the automobile, thereby allowing the tensioning belt 25 to be retracted onto the drum 8 of the winch 10. The foregoing operation can be accomplished without any need for the installer to exert potential injury-causing manual pressure against the child car seat 1 to hold it in place.

In order to evenly apply pressure to the child car seat 1, both ends of the tensioning belt 25 should be anchored to the automobile. In a typical full-size passenger vehicle, the rear seat will have three pairs of seat belts to accommodate three passengers. When the child car seat 1 is placed in the middle of the rear passenger seat, the seat belt pair for the middle passenger is used to secure the child seat in place. This leaves a seat belt pair at each side of the bench seat for use by a passenger. During installation of the child car seat 1, with the passenger seats unoccupied, each end of the tensioning belt 25 may be secured to the buckle of one of the proximate passenger seat belts. Where an S-hook 29 is used on the end of the tensioning belt 25, it may be passed through an opening in a male buckle of the adjacent seat belt pair. Alternatively, to the S-hook 29, or in addition to it, a conventional female seat belt buckle may be attached to one or both ends of the tensioning belt 25 for mating with a complementary buckle on the adjacent seat belt pair. That is, a male buckle on the end of the tensioning belt 25 may be inserted into the female buckle of the seat belt adjacent to child car seat 1. Alternatively, a female buckle on the end of the tensioning belt 25 may receive the male buckle of the adjacent seal belt pair.

In accordance with the invention, the child car seat 1 need not be limited to the middle position, but may be positioned at one of the side passenger positions of the rear passenger seat. In this case, only the center pair of seat belts would be available for anchoring the child car seat 1. The side of the child car seat 1 proximate the rear side window would not have a seat belt available for connection to a corresponding end of the tensioning belt 25. In accordance with the invention, an anchoring apparatus is provided for an end of the tensioning belt 25 for which no automobile seat belt is available.

Figure 4:
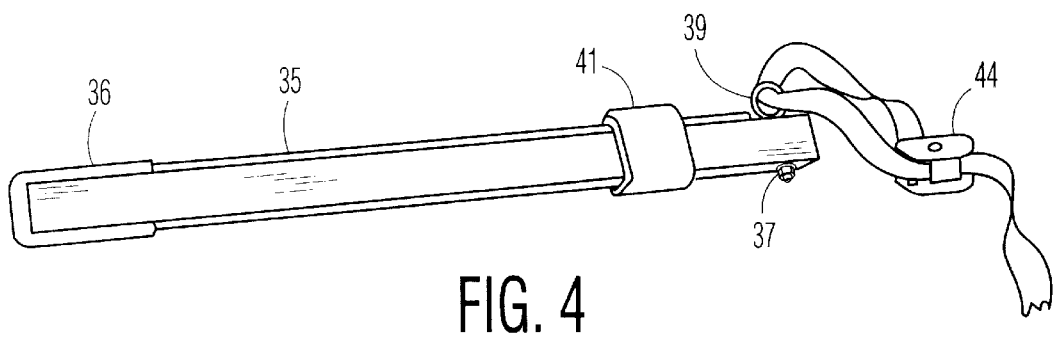
FIG. 4 is a perspective side and bottom view of a supplemental apparatus for the preferred embodiment of the invention.

Referring now to FIG. 4, there is shown an anchoring lever in the form of a rod 35 having an aperture 37 at one end in which an eye-bolt 39 is received. The anchor rod 35 serves to secure the end of the belt 25 proximate the side of the vehicle in which the child seat is to be mounted. The anchor rod 35 preferably has a length at least equal to approximately one half the width of the automobile and is made of a strong rigid material, e.g., steel or aluminum, although strong plastics may also suffice. The eye-bolt 39 is held in place by a lock washer and nut or other suitable fastener as will be known to those skilled in the art. A plastic protector 36 covers the end of the rod 35 opposite the end in which the eye-bolt 39 is received. Surrounding the rod 35 approximately six inches from the eye-bolt 39 is a plastic collar 41.

Figure 5:
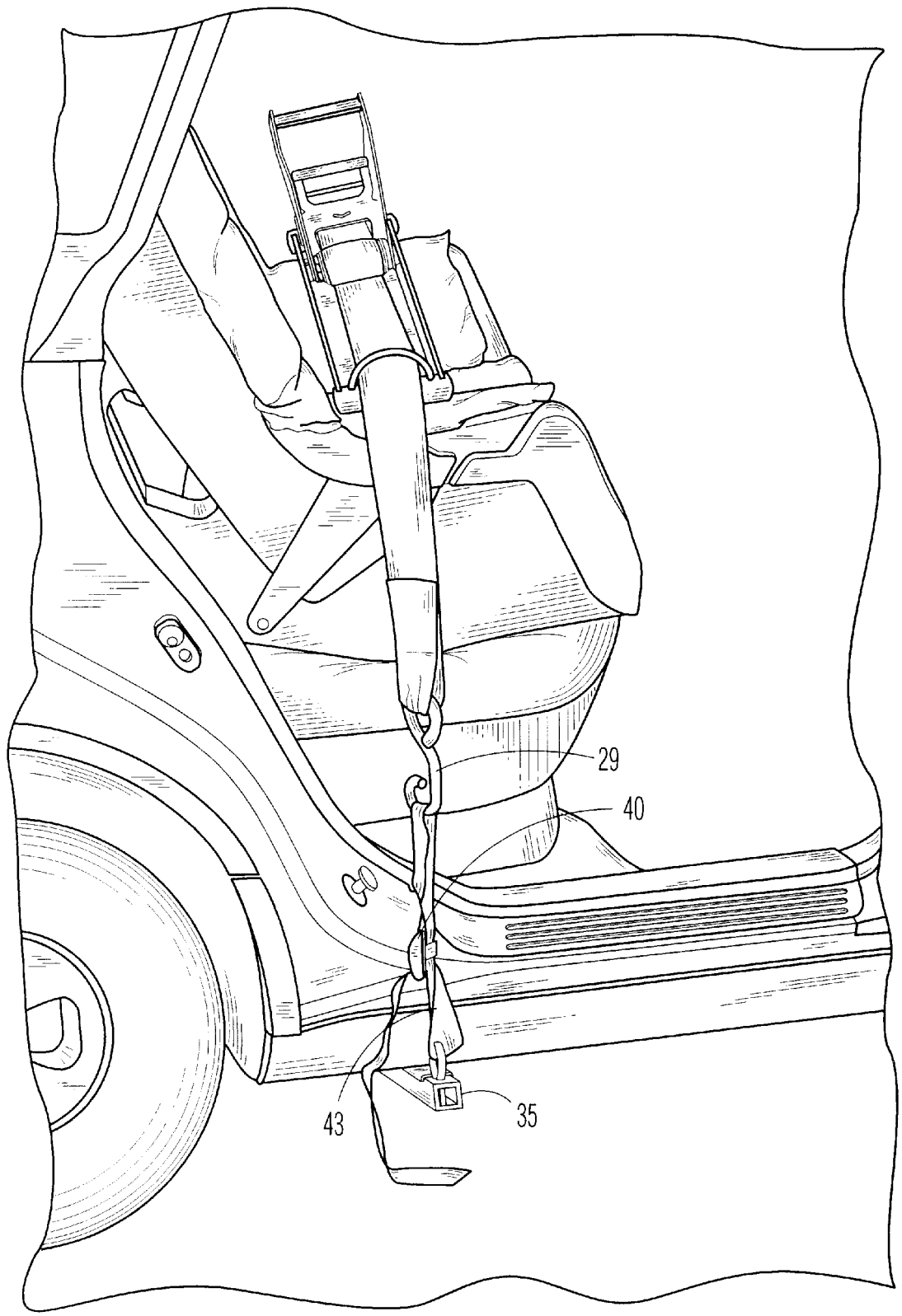
FIG. 5 is an end perspective view of the apparatus of the preferred embodiment of the invention in use with the supplemental apparatus of FIG. 4 in the intended environment.
Figure 6:
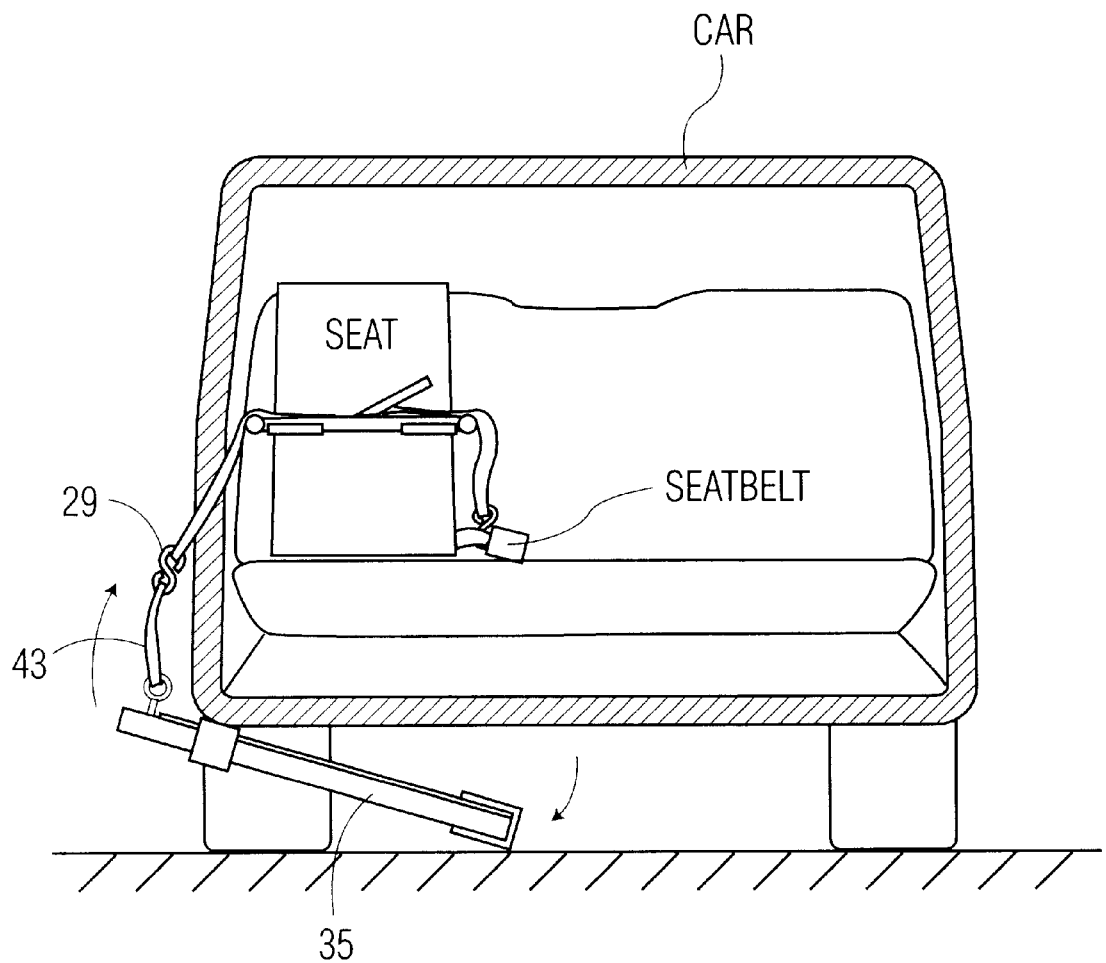
FIG. 6 is a schematic elevation view of the apparatus of the preferred embodiment of the invention in use with the supplemental apparatus of FIG. 4 in the intended environment.

Referring now to FIGS. 5 and 6, the rod 35 may be slid under the vehicle beneath the rear passenger seat in which the child car seat 1 is to be installed, in a direction transverse to the length of the automobile. The end of the rod 35 distal from the eye-bolt 39 is inserted first and rested on the ground with the collar 41 in alignment with the frame of the automobile so that it engages the frame when the end of the rod 35 proximate the eye-bolt 39 is raised, the intersection of the rod 35 with the ground being a pivot point for the rod 35.

The tensioning belt 25 of the winch 10 can be connected to an intermediate belt 43 having one end looped about the eye-bolt 39 and another end looped onto an S-connector 29 which is attached to an end of the tensioning belt 25. An S-connector on the tensioning belt 25 can also be hooked onto the eye-bolt 39.

Alternatively, the rod 35 may be provided with a female seatbelt buckle of the type found in automobiles. In the latter case, the same buckle used to secure the child seat to the center position in the rear passenger seat of an automobile may also be used to secure either end of the belt 25 when the child seat is to be mounted in a side passenger seat of the vehicle.

The rod 35 may be placed on the ground under the vehicle in a direction transverse to the front to rear axis of the automobile. The end of the belt 25 which is not secured to the rod 35 can be secured to the seatbelt of the middle passenger position or the opposite side position of the rear seat of the automobile. The end of the tensioning belt 25 to be connected to the eye-bolt 39 can be passed through an open window in the vehicle, or where the vehicle is a four-door car, the door can merely be open while the child car seat is installed. Installation of the child seat using the rod 35 is similar to the method described for the case wherein the child seat is in the center position, the difference being that when the rod is used, one end of the belt 7 is secured to a seatbelt buckle and the other end is secured to the rod 35 which is on the ground.

As the actuator is operated to shorten the tensioning belt 25 having one end connected to the rod 35, for exerting pressure against the child car seat 1, the rod 35 is captured between the frame of the automobile and the ground as best seen in FIG. 6. The eye-bolt 39 and the rod 35 perform the function of the seat belt on the opposite side of the child car seat 1 in providing an anchor for the tensioning belt 25. Once tension on the tensioning belt 25 has been relieved, i.e., after the child seat has been installed on the passenger seat and secured by the passenger seat belts, the rod 35 can be lowered to the ground picked up, detached from the tensioning belt 25, and stored for future use.

The invention allows installation of a child car seat while it is secured to the passenger seat under a very high degree of pressure. In this state the automobile seatbelt can be secured and tightened without the installer having to exert any force that might be injurious. Only moderate strength is required on the part of the installer due to the mechanical advantage provided by the winch 3.

It is to be appreciated that the foregoing is a description of a preferred embodiment of the invention to which variations and modifications may be made without departing from the spirit and scope of the invention. For example, various buckle combinations or other connector devices may be used at the ends of the belt 25 and within the automobile or on the ground, or on other externally mounted securing devices. The belt 25 or rod 35 may be provided with other connectors, e.g., anchors which grasp devices outside the vehicle or the underside of the vehicle itself.

What is claimed is:

1. Stabilization apparatus for keeping a child car seat pressed into a passenger seat of a vehicle while a seat belt of the vehicle is passed through the child car seat and fastened to secure the child car seat to the vehicle with substantially no freedom of independent movement therebetween comprising, pressing means mountable on said child car seat, anchoring means connectable to a seat belt in said vehicle other than a seat belt which is used to secure the child car seat to the vehicle, ratchet forcing means operatively connectable between said pressing means and said anchoring means, said anchoring means comprising a flexible web having a segment with one end connected to said ratchet forcing means, and an automobile seat belt buckle connected to another end for been latched to a complementary automobile seat belt buckle, actuator means operatively connected to said ratchet forcing means for operating said ratchet forcing means to urge said pressing means toward said passenger seat thereby pressing said child car seat into said passenger seat, and keeping said child car seat pressed into said passenger seat so that said seat belt of the vehicle can be passed through the child car seat and fastened to secure the child car seat to the vehicle, and release means operatively connected to said ratchet forcing means for relieving the urging of said pressing means toward said passenger seat and enabling said pressing means to be removed from said child car seat after said seat belt of the vehicle has been fastened leaving the child car seat secured to the vehicle.

2. Stabilization apparatus for keeping a child car seat pressed into a passenger seat of a vehicle while a seat belt of the vehicle is passed through the child car seat and fastened to secure the child car seat to the vehicle with substantially no freedom of independent movement therebetween comprising, pressing means mountable on said child car seat, anchoring means connectable to said vehicle, said anchoring means comprising a flexible web having a segment with one end connected to said ratchet forcing means and another end connected to a fastener means adapted to be fixedly secured relative to said vehicle, ratchet forcing means operatively connectable between said pressing means and said anchoring means, actuator means operatively connected to said ratchet forcing means for operating said ratchet forcing means to urge said pressing means toward said passenger seat thereby pressing said child car seat into said passenger seat, and keeping said child car seat pressed into said passenger seat so that said seat belt of the vehicle can be passed through the child car seat and fastened to secure the child car seat to the vehicle, release means operatively connected to said ratchet forcing means for relieving the urging of said pressing means toward said passenger seat and enabling said pressing means to be removed from said child car seat after said seat belt of the vehicle has been fastened leaving the child car seat secured to the vehicle, and lever means having a lever fastener means mounted on one end thereof, the other end of said lever means being engageable with the ground beneath said vehicle, said fastener means being connectable to said lever fastener means, said lever means being captured between the ground and a surface of said vehicle when said lever means is extended beneath said vehicle with said fastener connected to said lever fastener means and said ratchet forcing means actuated to urge said pressing means toward said passenger seat.

3. Stabilization apparatus according to claim 2 wherein said ratchet forcing means comprises winch means having a drum to which said one end of said web means segment is connected, said actuator being operable for winding said web means onto said drum to urge said pressing means toward said passenger seat thereby pressing said child car seat into said passenger seat.

4. A method of keeping a child car seat pressed into a passenger seat of a vehicle while a seat belt of the vehicle is passed through the child car seat and fastened to secure the child car seat to the vehicle with substantially no freedom of independent movement therebetween comprising, connecting a ratchet forcing means to a pressing means, mounting said pressing means on said child car seat, connecting force transmitting means between said vehicle and said ratchet forcing means, and actuating said ratchet forcing means for causing said force transmitting means to urge said pressing means toward said passenger seat thereby pressing said child car seat into said passenger seat, passing said seat belt of the vehicle through the child car seat, fastening said seat belt to secure said car seat to said passenger seat without any slack in said seat belt, releasing said ratchet forcing means for relieving the urging of said pressing means toward said passenger seat, and removing said pressing means from said child car seat after said seat belt of the vehicle has been fastened leaving the child car seat secured to the vehicle.

5. A method according to claim 4 further comprising connecting a second force transmitting means between said vehicle and said ratchet forcing means.

6. A method according to claim 5 wherein said first force transmitting means comprises a first passenger seat belt and said second force transmitting means comprises a second passenger seat belt.

7. A method according to claim 5 further comprising placing a lever means with one end resting on a surface beneath the vehicle and another end removed from said surface whereby said lever means is captured between the surface and the vehicle, mounting a lever fastener means on said lever means proximate said another end of said lever means, connecting said first web fastener means to a first passenger seat belt, and connecting said second fastener means to said lever fastener means.

* * * * *